Jan. 10, 1950
J. M. GWINN, JR
AIRCRAFT
2,494,090
Filed Sept. 18, 1944
2 Sheets-Sheet 1
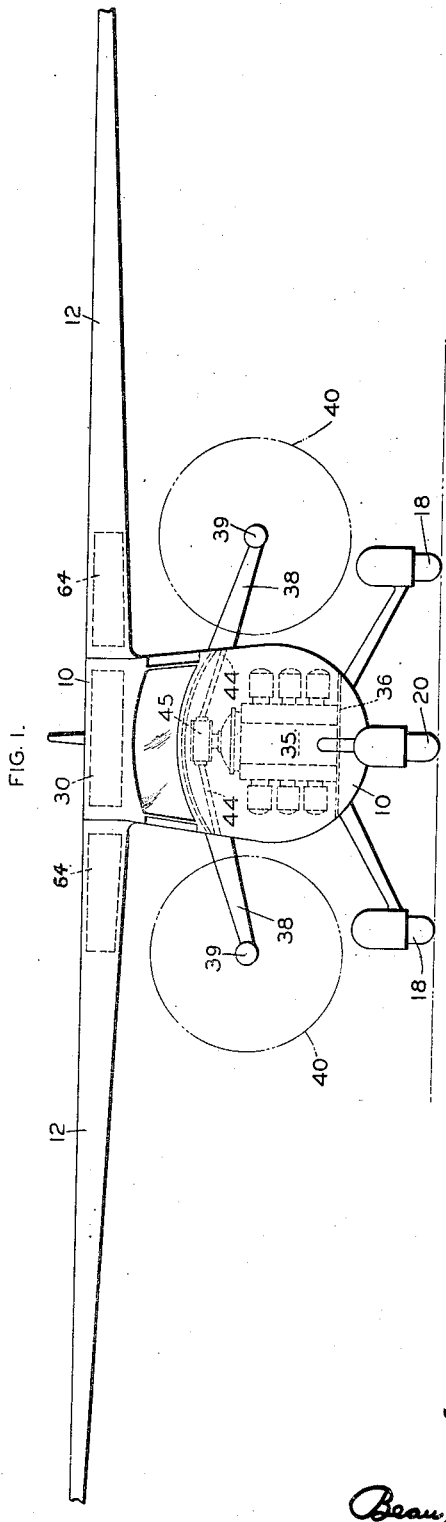
INVENTOR.
JOSEPH M. GWINN, JR.
BY
Beau, Brooks, Buckley & Beau.
ATTY.

Jan. 10, 1950     J. M. GWINN, JR     2,494,090
AIRCRAFT
Filed Sept. 18, 1944     2 Sheets-Sheet 2
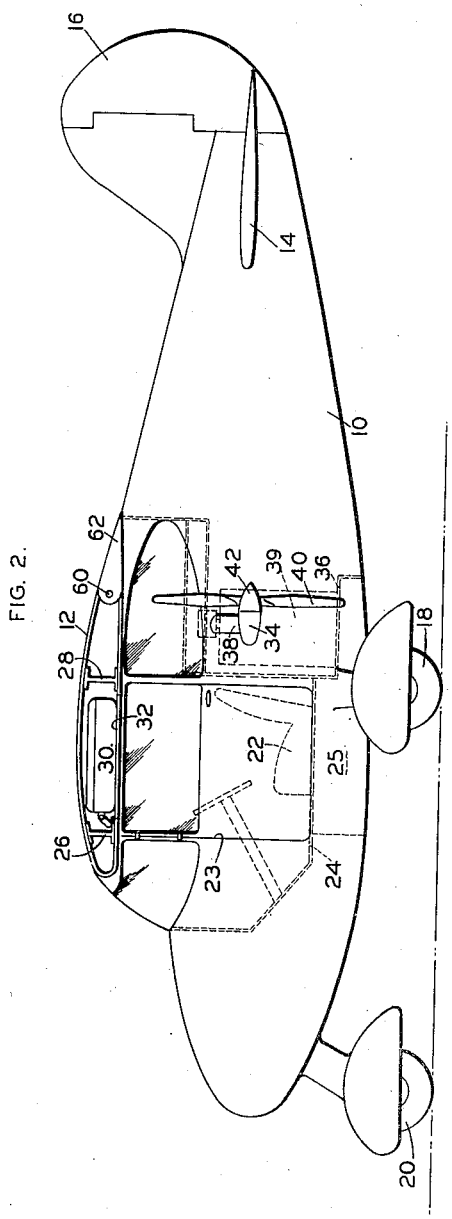
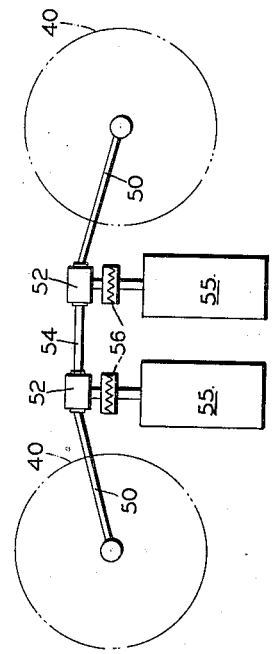
INVENTOR.
JOSEPH M. GWINN, JR.
BY
Beau, Brooks, Buckley & Beau.
ATTY.

Patented Jan. 10, 1950

2,494,090

UNITED STATES PATENT OFFICE 2,494,090

AIRCRAFT

Joseph M. Gwinn, Jr., San Diego, Calif.

Application September 18, 1944, Serial No. 554,627

2 Claims. (Cl. 244—13)

This invention relates to aircraft, and particularly to an improved private-owner type airplane such as is adapted to be relatively inexpensively manufactured and to be of improved practicability for so-called private or family use.

One of the objects of the invention is to provide an airplane having an improved general arrangement, whereby the passenger accommodation and flight control arrangements closely simulate present day automobile type accommodations and control arrangements. Another object of the invention is to provide an airplane for the purpose described which incorporates an improved engine-propeller arrangement, whereby an airplane having twin propeller advantages may be more economically manufactured and serviced. Another object of the invention is to provide a cabin type airplane having improved passenger and baggage accommodation arrangements. Another object of the invention is to provide an airplane for the purpose described which embodies improvements in the relative dispositions of the wing and landing gear and engine and propeller and passenger and baggage space elements of the airplane. Other objects and advantages of the invention will appear in the specification hereinafter.

In the drawings:

Fig. 1 is a front elevation of an airplane of the invention;

Fig. 2 is a side elevation thereof; and

Fig. 3 is a diagrammatic front elevation of a modified form of the engine-propeller arrangement.

The drawings illustrate the invention as being embodied in an airplane of the high wing type, wherein the fuselage is designated generally at 10; the wing panels at 12—12; the horizontal stabilizer-elevator unit at 14; and the vertical fin-rudder unit at 16. The landing gear is shown to comprise a tricycle type gear including a pair of directionally fixed landing wheels 18—18 carried by struts extending from opposite sides of the fuselage at a position longitudinally of the airplane just aft of the center of gravity of the complete airplane and its load. A nose wheel of the usual castoring or steerable type is shown at 20.

The passenger cabin is disposed interiorly of the fuselage between the wing panel roots, and a seat is indicated at 22 for positioning the passengers longitudinally of the airplane approximately in line with the position of the center of gravity of the loaded airplane. Thus, it will be understood that variances in the weight of the passenger load will have no appreciable effects upon the longitudinal trim of the airplane, and that the problem of longitudinal control of the aircraft will therefore be simplified; thus making possible simplifications of the control system of the airplane, and enabling provision of a control arrangement simulating more closely the control arrangements of a modern automobile. A hinged door may be provided at either one or both of the sides of the fuselage as indicated at 23. As indicated at 24, the passenger compartment floor will extend horizontally transversely of the fuselage, and the space below the floor and under the seat 22 is occupied by another variable load element of the airplane such as the engine fuel tank as indicated at 25. Thus, the fuel tank will be approximately centered longitudinally of the airplane in the region of the center of gravity of the loaded airplane, and variances in the weight of the fuel load will therefore have no appreciable effect upon the longitudinal trim of the airplane, thereby further enhancing the ease and simplification of control of the airplane.

As illustrated in Fig. 1, the space above the ceiling of the cabin and within the upper portion of the fuselage between the beams furnishing supports for the wing panels may be conveniently employed to accommodate other variable load elements such as the baggage or parcels being carried by the airplane occupants. Thus, the wing support frame may include a pair of beams or spars as indicated at 26—28, and the space therebetween may be left clear of bracing throughout the lateral extent of the upper portion of the fuselage 10 whereby to accommodate baggage such as suit cases or other parcels as indicated at 30. A lower cover or door for the baggage space may be provided as indicated at 32 to be hinged to suitable supporting structure of the cabin frame; and it is contemplated that elevation of the baggage into the stowage space may be facilitated by providing straps or hangers or the like on the inner face of the door 32 whereby the parcels to be stowed may be first clamped against the inner face of the door 32 when the latter is hanging downwardly in compartment-open position. The door 32 may then be swung upwardly and caught in compartment closing position by a suitable latch means; and it will be understood that the operations of loading and unloading the baggage compartment may therefore be performed with utmost ease and facility by a passenger while sitting upon the seat 22. Another advantage of this baggage stowage arrangement is that the baggage load is thereby approximately centered longitudinally of the airplane in the region of the center of gravity of the loaded airplane, whereby variances in the baggage load will have no appreciable effect upon the longitudinal trim of the airplane. If preferred, the space within the ceiling of the cabin may be employed to house the fuel tank, and the space under the passenger seat may be employed to accommodate the baggage.

The engine-propeller arrangement of the airplane of the invention provides important features and advantages in that it simplifies the airplane structural problems and also provides an airplane of improved practicability for so-called private-owner purposes. As shown in Figs. 1–2, the engine is indicated at 35 to comprise any suitable vertical drive shaft engine type mounted upon a cross frame structure 36 of the fuselage at a position just aft of the passenger seat 22. Thus, the engine is located close to the passenger and fuel and baggage spaces of the airplane, whereby an unusually effective concentration of the relatively heavy elements of the airplane is effected in the region of the center of gravity thereof. Another advantage of this arrangement is that the engine is thereby disposed closely adjacent the fuel tank, thus simplifying the fuel transfer problem and conduit arrangements. Also, it will be appreciated that the engine is readily serviceable from exteriorly of the airplane by simply removing nearby side panel portions of the fuselage covering whereupon the engine will be exposed for mechanical adjustments thereof at convenient height and disposition relative to a mechanic standing on the ground.

The propeller mount and drive housing means of the airplane may preferably comprise a pair of hollow tubes or arms 38—38 which extend in cantilever mounted relation from opposite sides of the fuselage 10. At their outer ends the arms 38—38 carry suitable bearing devices 39—39 for supporting corresponding propellers 40—40 having their hubs 42—42 mounted upon the bearings 39—39 of the support arms. It will be understood that the propeller hubs 42—42 will be geared, as by means of conventional bevel gear devices or the like, to corresponding drive shafts 44—44 extending through the hollow interiors of the arms 38—38 into connection with a bevel gear device 45 which is driven by the power output shaft of the engine 35. Thus, the propellers 40—40 are geared to be simultaneously driven by the single engine 35, and the propellers will be arranged to rotate in counter directions, whereby to cancel the torque effects thereof. Thus, the airplane will be symmetrical about the vertical plane of its thrust axis, and the torque problem is eliminated.

The propeller support arms 38—38 may be constructed as shown in the drawing to extend directly from the fuselage structure and to be solely supported thereby, whereby separate manufacture and assembly of the airplane fuselage and wing and landing gear elements may be performed without complications such as are encountered in arrangements involving dependency of the propeller support means upon portions of the airplane other than the fuselage. Also, the arrangement of the invention provides the propeller support tubes to be independent of deflection forces such as would otherwise be imposed thereon in connection with elastic deformations of the landing gear and wing structures to produce misalignment of the propeller drive gear and shaft mechanisms. The engine-propeller arrangement of the invention disposes the propellers to be toward the rear of the wing, and thus to provide a "pusher" type airplane. Through use of a pair of propellers they may be of relatively small diameter and therefore adapted to fit within the space provided below the wing without coming too close to the ground line for safety. Thus, a pair of propellers of small dimension may be arranged as shown in the drawing to provide a more compact airplane arrangement than if a single larger diameter propeller were to be employed, and the twin propellers are disposed at opposite sides of the fuselage and rearwardly of the passenger doorways without requiring the fuselage to be of other than structurally simple form.

Fig. 3 shows another possible form of the engine-propeller arrangement wherein the propellers 40—40 are driven by shafts 50—50 which connect into gear boxes 52—52 having a cross shaft 54 connected therebetween. A pair of engines as indicated at 55—55 are mounted in side-by-side relation upon the fuselage behind the passenger compartment and are arranged to drive through clutch devices as indicated at 56, connected to each of the gear boxes 52—52. Thus, it will be understood that either or both of the engines 55—55 may be operated at any given time, and that in any case the cross shaft and gear box arrangement will provide that both propellers 40—40 will be simultaneously driven by either one or both of the engines. Thus, it will be appreciated that either single or dual engine arrangements may be employed at the option of the pilot. For example, single engine operation may be sufficient under reduced power demand conditions such as when cruising, while dual engine operation will be preferred under heavy power demand conditions such as when climbing or for fast cruising. The dual engine arrangement will also provide an increased safety factor in event of misfunctioning of one of the engines, because under such circumstances the faulty engine may be simply declutched from the propeller drive system and the airplane flown to a safe landing under power from the other engine.

As shown in Fig. 2, the plane of the propeller discs of the airplane will preferably be disposed substantially in line with the hinges 60 of the wing flaps 62, whereby the propeller tips will avoid interference with deflection movements of the wing flaps for flight control purposes. Thus, the desirable characteristics of a pusher type airplane are acquired in addition to disposing the propellers to be completely free of the airstream wake of the wing or other body portions of the airplane, whereby the propellers are arranged to operate in "free" air. This effect is further enhanced by reason of the fact that the propeller support means consists in each case solely of a single arm extending from the fuselage, and without additional bracing, whereby the airstreams acted upon by the propellers will be substantially normal.

As indicated at 64—64 in Fig. 1, provision may be made for carrying additional baggage within the wing panels 12—12 at positions longitudinally of the airplane which are substantially in line with the position of the passenger seat, whereby to dispose the extra baggage loads at approximately the position of the center of gravity of the loaded airplane for reasons given hereinabove. It will of course be appreciated that although references to only a few forms of the invention have been made hereinabove, various changes may be made therein without departing from the spirit of the invention and the scope of the appended claims.

I claim:

1. An airplane including a fuselage, a wing extending at opposite sides of said fuselage and having a flap hinged to said wing at the rear portion thereof along a hinge axis extending spanwise of the wing, engine means mounted within said fuselage and positioned longitudinally thereof in the region of intersection of said wing and said fuselage, an arm extending laterally from each of the two sides of said fuselage, a propeller mounted upon each of said arms and disposed so as to coincide with the spanwise positions of said flaps and longitudinally of the airplane so that the path of the propeller tips is closely adjacent to but clear of the corresponding flap hinges, and power transmission means connecting said engine means to said propellers and disposed to extend within said arms.

2. An airplane including a fuselage, a wing extending at opposite sides of said fuselage and having a hinged flap at the rear portion thereof, engine means mounted within said fuselage, an arm extending laterally from each of the two sides of said fuselage, a propeller mounted upon each of said arms and disposed longitudinally of the airplane so that the path of the propeller tips is closely adjacent to but clear of the corresponding flap hinges, power transmission means extending through said arms and connecting said engine means to said propellers, a passenger compartment within said fuselage and having an entranceway ahead of said propellers, a passenger seat adjacent the airplane center of gravity, a variable load compartment in substantially vertical alignment with the airplane center of gravity, and a landing wheel positioned aft of the airplane center of gravity and the passenger entranceway and ahead of and laterally in front of each of said propellers.

JOSEPH M. GWINN, Jr.

REFERENCES CITED

The following references are of record in the file of this patent:

UNITED STATES PATENTS

| Number | Name | Date |
|---|---|---|
| 982,290 | Moore | Jan. 24, 1911 |
| 1,687,203 | Hall | Oct. 9, 1928 |
| 1,752,012 | Lauchin | Mar. 25, 1930 |
| 1,764,336 | Narusch | June 17, 1930 |
| 1,952,786 | Bellanca | Mar. 27, 1934 |
| 2,002,299 | Sera et al. | May 21, 1935 |
| 2,174,946 | Ray et al. | Oct. 3, 1939 |
| 2,183,676 | Gwinn | Dec. 19, 1939 |
| 2,359,652 | Larsen | Oct. 3, 1944 |
| 2,367,538 | Sullivan | Jan. 16, 1945 |

FOREIGN PATENTS

| Number | Country | Date |
|---|---|---|
| 8,394 | Great Britain | A. D. 1911 |
| 437,044 | France | Feb. 7, 1912 |